(12) United States Patent
Kawamura

(10) Patent No.: US 12,580,595 B2
(45) Date of Patent: Mar. 17, 2026

(54) COMMUNICATION CONTROL APPARATUS AND COMMUNICATION CONTROL METHOD

(71) Applicant: Faurecia Clarion Electronics Co., Ltd., Saitama (JP)

(72) Inventor: Shinji Kawamura, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 299 days.

(21) Appl. No.: 18/298,572

(22) Filed: Apr. 11, 2023

(65) Prior Publication Data

US 2023/0353171 A1 Nov. 2, 2023

(30) Foreign Application Priority Data

Apr. 28, 2022 (JP) ................................. 2022-075070

(51) Int. Cl.
 *H04W 4/44* (2018.01)
 *H04B 1/00* (2006.01)
 *H04B 17/318* (2015.01)
(52) U.S. Cl.
 CPC ........... *H04B 1/006* (2013.01); *H04B 1/0078* (2013.01); *H04B 17/318* (2015.01)
(58) Field of Classification Search
 CPC .. G05D 1/0214; G05D 1/0016; G05D 1/0022; G05D 1/0061; G05D 1/0088;
 (Continued)

(56) References Cited

U.S. PATENT DOCUMENTS 5,789,889 A 8/1998 Pientka et al.
11,190,983 B2 * 11/2021 Gapin et al. .......... H04W 28/22
(Continued)

FOREIGN PATENT DOCUMENTS

JP H10503735 A 4/1998
JP 2017125731 A 7/2017
(Continued)

OTHER PUBLICATIONS

Xiongbin Rao, WO 2020/258011A1, Adaptive retransmission method, remote control apparatus, aircraft and movable platform, Dec. 30, 2020, all (Year: 2020).*

(Continued)

*Primary Examiner* — Curtis A Kuntz
(74) *Attorney, Agent, or Firm* — Volpe Koenig

(57) ABSTRACT

To switch communication systems at an appropriate frequency the present system includes multiple respective communication parts; and a communication part selection part selecting a communication part for transmitting and receiving predetermined data from the multiple communication parts, wherein the communication status including a delay time for each of the multiple communication parts is acquired and stored. To refer to a storage part, delay times of selected communication parts are compared in a time series manner, variations in the delay time ae determined; and a communication part to be used for transmission and reception of data is determined as a switching destination communication part from the communication status of each communication part when the delay time of the selected communication part indicates a predetermined increase trend. When the switching determination part determines the switching destination communication part, the communication part selection part selects the switching destination communication part.

6 Claims, 6 Drawing Sheets

(58) Field of Classification Search

CPC .... G05D 1/0223; G05D 1/0038; H04B 1/006;
H04B 1/0078; H04B 17/318; H04W
24/08; H04W 4/44; H04W 24/02; G08G
1/16; G08G 1/166

See application file for complete search history.

(56) References Cited

U.S. PATENT DOCUMENTS

| | | | |
|---|---|---|---|
| 11,677,597 | B2 * | 6/2023 | Fukuzono et al. ...... H04L 27/01 |
| 12,164,293 | B2 * | 12/2024 | Nakano et al. ...... G05D 1/0022 |
| 2011/0007651 | A1 | 1/2011 | Kataoka et al. |
| 2017/0099686 | A1 * | 4/2017 | Green ...................... H04L 5/14 |
| 2021/0191403 | A1 * | 6/2021 | Rastoll et al. ....... G05D 1/0214 |
| 2021/0250157 | A1 * | 8/2021 | Kenney .............. H04L 27/2603 |
| 2021/0255614 | A1 | 8/2021 | Yamazaki et al. |
| 2021/0258982 | A1 | 8/2021 | Otaka et al. |
| 2022/0413489 | A1 | 12/2022 | Nakano et al. |
| 2023/0199636 | A1 | 6/2023 | Hoshino |

FOREIGN PATENT DOCUMENTS

| | | |
|---|---|---|
| JP | 2021018636 A | 2/2021 |
| JP | 2021-132301 A | 9/2021 |
| JP | 2021126978 A | 9/2021 |
| WO | 2009110103 A1 | 9/2009 |
| WO | 2021/130880 A1 | 7/2021 |
| WO | 2022/075166 A1 | 4/2022 |

OTHER PUBLICATIONS

Extended European Search Report issued on Jul. 19, 2023 for European Patent Application No. 23169489.4.

Japanese Office Action issued on Sep. 2, 2025 for Japanese Patent Application No. 2022-075070.

* cited by examiner

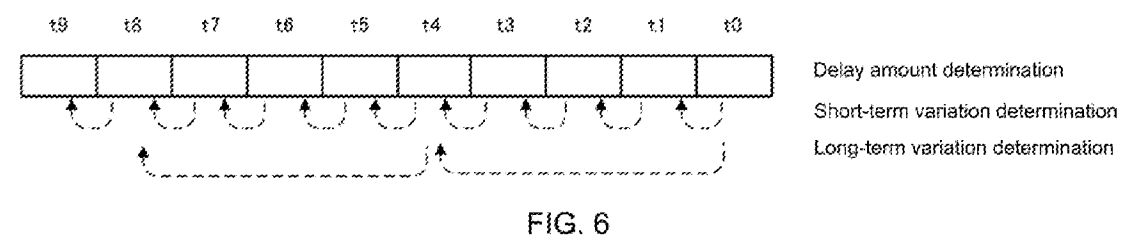

Delay amount determination

Short-term variation determination

Long-term variation determination t0  t1  t2  t3  t4  t5  t6  t7  t8  t9

FIG. 6

COMMUNICATION CONTROL APPARATUS AND COMMUNICATION CONTROL METHOD

TECHNICAL FIELD

The present invention relates to a communication control apparatus and a communication control method.

BACKGROUND

Conventionally, a technique is known for switching and using multiple communication systems. For example, Patent Document 1 describes that "A communication apparatus is a communication apparatus mounted on a mobile body, comprising: a communication part which communicates with an external apparatus using a first communication system or a second communication system different from the first communication system; a determination part which dynamically determines the communication priority of the apparatus for each access point; and a communication control part which causes the communication part to transmit information including the information (indicating the communication priority determined by the determination part) and the mobile information (about the mobile body) to each access point, wherein the communication control part causes the communication part to communicate with the external apparatus in accordance with the determined communication priority, and causes the communication part to communicate in accordance with the determined communication priority when the communication switches.

PRIOR ART DOCUMENT

Patent Document

[Patent Document 1] JP 2021-132301

SUMMARY OF THE INVENTION

Problems to be Solved by the Invention

The communication apparatus according to the prior art can switch communication systems based on the communication delay time, throughput, communication speed, traffic volume, bandwidth usage rate, number of error packets, number of lost packets, etc. Unfortunately, the prior art does not take into account the need to switch before the quality of communication becomes unacceptable and reduce the frequency of switching of communication systems.

For example, a case is assumed in which a vehicle transmits information (indicating the status of the vehicle and its surroundings) to a terminal carried by a user, who then operates the terminal in order to confirm the status of the vehicle and transmit instructions for driving, if necessary. If the transmission/reception delay increases in such cases, the time margin will be lost and the vehicle may not be able to be controlled in time. Therefore, it is necessary to switch to another communication system before the magnitude of the delay exceeds the allowable range. However, since the switching of communication systems itself can also cause a delay or a decrease in communication quality, the frequency of switching of communication systems is desirably minimized.

With this in mind, an object of the present invention is to switch communication systems at an appropriate frequency.

Means for Solving the Problems

In order to achieve the abovementioned object, a representative communication control apparatus according to the present invention comprises: multiple communication parts corresponding to multiple respective communication parts; a communication part selection part which selects a communication part to be used for transmitting and receiving data from the multiple communication parts; a communication status acquisition part which acquires a communication status including a delay time for each of the multiple communication parts; a storage part which stores the communication status acquired by the communication status acquisition part; a delay time determination part which refers to the storage part, compares the delay times of selected communication parts that are the communication parts in a time series manner, and determines variations in the delay time; a switching determination part which refers to the storage part and determines the communication part to be used for transmission and reception of the data as a switching destination communication part from the communication status of each communication part when the delay time of the selected communication part indicates a predetermined increase trend as a result of the determination by the delay time determination part, wherein, when the switching determination part determines the switching destination communication part, the communication part selection part selects the switching destination communication part as a newly selected communication part.

Effects of the Invention

The present invention enables the switching of communication systems at an appropriate frequency. The following description of embodiments will elucidate the problems, configurations, and effects other than those described above.

BRIEF DESCRIPTION OF THE DRAWINGS

FIG. 6 is an explanation of the delay amount, short-term variations, and long-term variations.

DETAILED DESCRIPTION

Examples will hereinafter be described with reference to the drawings.

Example 1

Figure 1:
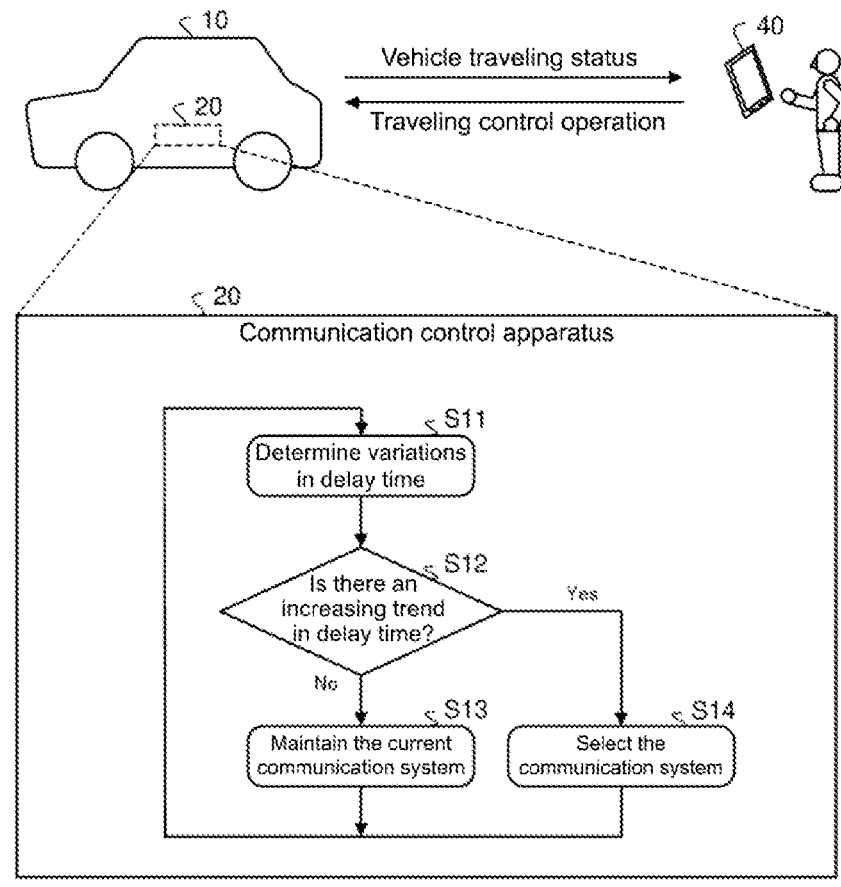
FIG. 1 is an explanatory view of the control of a vehicle according to Example 1.

FIG. 1 is an explanatory view of the control of a vehicle according to Example 1. A communication control apparatus 20 is mounted on a vehicle 10 illustrated in FIG. 1. The communication control apparatus 20 is an electronic control unit (ECU) that can communicate with a terminal 40 carried by a user of the vehicle 10. Moreover, the communication control apparatus 20 has an automatic parking function for automatically executing traveling control of the vehicle related to parking.

When the user drives the vehicle 10, gets out of the vehicle 10 at the entrance/exit of a parking lot, and executes the automatic parking function, the vehicle 10 performs traveling control to automatically travel to a parking spot and park in the parking spot. During this automatic traveling control, the communication control apparatus 20 transmits information on the vehicle traveling status to the terminal 40. The information on the vehicle traveling status includes information on the status of the vehicle 10 itself (vehicle speed, etc.) and information on the status of the periphery of the vehicle 10 (radar detection results, camera images, etc.)

The user can confirm the vehicle traveling status using the terminal 40. Then, an operation for controlling the traveling of the vehicle 10 can be carried out as necessary. For example, if the user determines that an emergency stop is necessary upon confirming images of their surroundings, the user carries out an emergency stop operation on the terminal 40. The terminal 40 receives the emergency stop operation and transmits instructions (to request the emergency stop) to the vehicle control apparatus 20. Upon receiving instructions to request the emergency stop, the communication control apparatus 20 gives priority to the instructions from the terminal 40 over the automatic traveling control, thereby stopping the vehicle 10.

As described above, the communication control apparatus 20 transmits the vehicle traveling status to the terminal 40 and receives the traveling control operation from the terminal 40. Here, the communication control apparatus 20 comprises multiple communication parts corresponding to multiple respective communication systems. If the communication control apparatus 20 can communicate with the terminal 40 using multiple communication systems, it is desirable to transmit the vehicle traveling status and receive the traveling control operation using a communication system with good communication quality. Among the communication qualities, the delay in transmission and reception is an important item. This is because, if the transmission/reception delay increases, the time margin will be lost for the user's determination and operation, so the user may not be able to operate the system in time to make an emergency stop.

The communication control apparatus 20 selects a communication system with a small delay from among multiple communication systems and transmits and receives data related to the control of the vehicle with the terminal 40. However, the delay is not always constant. When the delay of the selected communication system fluctuates and the resultant delay is outside the allowable range, the vehicle may not be able to be controlled in time. Therefore, the communication system is required to be switched before the delay goes outside of the allowable range. In contrast, since the switching of communication systems itself can also cause a delay or a decrease in communication quality, the frequency of switching of communication systems is desirably minimized.

Therefore, the communication control apparatus 20 performs communication to confirm the communication quality for communication systems other than the selected one as appropriate; wherein, the delay time of the currently selected communication system has an increase trend, so the communication control apparatus 20 determines the quality of each communication system and switches the communication system, if necessary.

Specifically, the communication control apparatus 20 compares the delay time of the selected communication system in a time series manner and determines variations in the delay time (Step S11). If the delay time of the selected communication system does not have an increase trend (Step S12; No), the communication control apparatus 20 maintains the current communication system (Step S13) and the process returns to Step S11. When the delay time of the selected communication system has an increase trend (Step S12; Yes), the communication control apparatus 20 determines the quality of each communication system and selects a communication system (when the selected communication system is different from the selected communication system, switching to another communication system is executed) (Step S14), and the process returns to Step S11 with the selected communication system used as a newly selected communication system.

As described above, the communication control apparatus 20 can switch the communication system (before the delay time goes outside the allowable range) by evaluating the increase trend of the delay time. Moreover, the communication control apparatus 20 maintains the selected communication system if the increase trend is not significant, thus reducing the frequency of switching the communication system. Note that in evaluating the increase trend of the delay time, short-time variations, long-time variations, and the magnitude of the delay time itself can be used as indicators; however, the details of this point will be described later.

Figure 2:
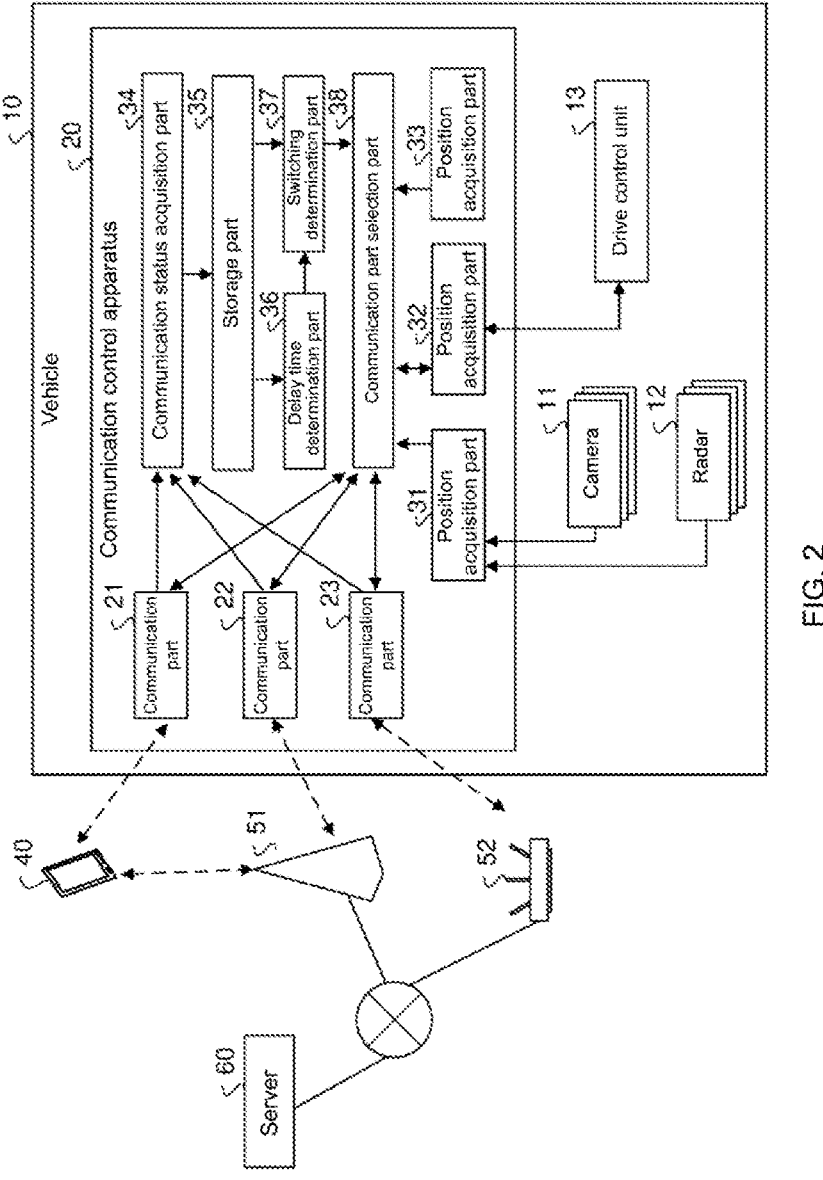
FIG. 2 is a configuration diagram illustrating the configuration of a communication control apparatus.

FIG. 2 is a configuration diagram illustrating the configuration of a communication control apparatus 20. The communication control apparatus 20 is mounted on the vehicle 10. Moreover, the communication control apparatus 20 is connected to one or more cameras 11, one or more radars 12, a drive control unit 13, etc. The camera 11 images the surroundings of the vehicle 10. The radar 12 detects objects present in the periphery of the vehicle 10. The radar 12 may be a radio wave type or a sound wave type sonar. Moreover, it may be LIDAR (Light Detection and Ranging, Laser Imaging Detection and Ranging) A drive control unit 13 is a group of units which controls the acceleration/deceleration and steering of the vehicle.

The communication controller 20 has therein communication parts 21 to 23, a vehicle determination part 31, a vehicle control part 32, a position acquisition part 33, a communication status acquisition part 34, a storage part 35, a delay time determination part 36, a switching determination part 37, and a communication part selection part 38.

The communication parts 21 to 23 are communication parts of different communication systems.

The communication section 21 communicates by Bluetooth (registered trademark), UWB (Ultrawideband), etc.

The communication part 22 communicates via a mobile communication system. Mobile communications can be further distinguished, for example, by fourth generation (4G), fifth generation (5G), etc.

The communication part 23 communicates by wireless LAN (Local Area Network).

The communication part 21 can directly communicate with the terminal 40. The communication part 22 can communicate with the user terminal 40 and a server 60 via a base station 51. The communication part 23 can communicate with the terminal 40 and a server 60 via a router 52. The server 60 manages parking lot data (indicating the arrangement of parking spots in the parking lot) and vacancy status data (indicating the vacancy status of each parking spot).

The vehicle determination part 31 acquires information on obstacles present in the periphery of the vehicle 10. Specifically, the vehicle determination part 31 identifies obstacles from the images of the camera 11 and the output of the radar 12.

The information on obstacles is one piece of data indicating the status of the vehicle.

The position acquisition part 33 acquires the position information of the vehicle 10. As an example, a global positioning system may be used to acquire the position information. The position information of the vehicle 10 is one piece of data indicating the status of the vehicle.

The vehicle control unit 32 acquires the vehicle speed, control status of acceleration and deceleration, and steering status from the drive control unit 13, and uses them as one piece of data indicating the status of the vehicle.

The vehicle control part 32 controls the traveling of the vehicle 10 using the determination results by the vehicle determination part 31, the position information acquired by the position acquisition part 33, the status of the host vehicle acquired from the drive control unit 13, etc.

When the vehicle control part 32 receives data indicating instructions for traveling of the vehicle 10 from the terminal 40, the vehicle control part 32 gives priority to the instructions from the terminal 40. For example, when vehicle control part 32 receives stop instructions from the terminal 40 while in the process of controlling the parking of the vehicle in the parking spot, the vehicle control part 32 performs control to stop the vehicle 10. Moreover, when the vehicle control part 32 receives information on a parking spot from the terminal 40 while controlling the travel of the vehicle 10, it can also start control to park in the accepted parking spot.

The communication part selection part 38 selects a communication part to be used for transmitting/receiving data related to the control of the vehicle from the multiple communication parts 21 to 23. The communication part selected by the communication part selection part 38 is referred to as a selected communication part. The data related to the control of the vehicle includes data indicating the status of the vehicle and data indicating instructions for traveling of the vehicle 10.

The communication status acquisition part 34 acquires the communication status of each of the multiple communication parts 21 to 23 at a predetermined time interval.

The communication status is also acquired for the selected communication part and communication parts other than the selected communication part. The communication status includes the delay time, signal strength, noise, etc.

The storage part 35 stores the communication status acquired by the communication status acquisition part 34 in association with the communication parts 21 to 23.

The delay time determination part 36 refers to the storage part 35, compares the delay times of selected communication parts in a time series manner, and determines variations in the delay time. Moreover, the delay times of communication parts other than the selected communication part are compared in a time series manner in order to determine variations in the delay time.

A switching determination part 37 which refers to the storage part 35 and determines the communication part to be used for transmission and reception of the predetermined data as a switching destination communication part from when the communication status of each communication part of the delay time of the selected communication part indicates a predetermined increase trend as a result of the determination by the delay time determination part 36.

When the switching determination part 37 determines the switching destination communication part, the communication part selection part 38 selects the switching destination communication part as a newly selected communication part.

Figure 3:
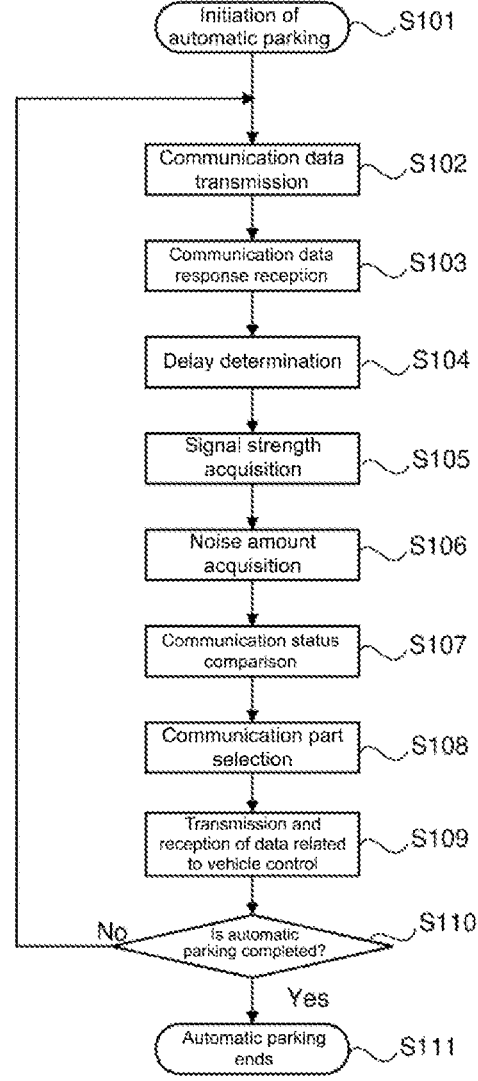
FIG. 3 is a flowchart illustrating the processing procedure of automatic parking.

FIG. 3 is a flowchart illustrating the processing procedure of automatic parking according to Example 1. The communication control apparatus sequentially executes the following Steps S101 to S111 in the automatic parking process.

Step S101: In response to instructions from the terminal 40, the vehicle control part 32 initiates automatic parking of the vehicle 10 alone. In addition to instructions from the terminal 40, it can also be started by remote control keys, timer settings, etc.

Step S102: Each of the communication parts 21 to 23 confirms communication and ascertains a communication delay. Specifically, the communication parts 21 to 23 transmit communication data for communication confirmation to the terminal 40. The communication data has transmission time data therein.

Step S103: Each of the communication parts 21 to 23 receives a response to the communication data transmitted in Step S102. The communication status acquisition section 34 calculates the delay time from the difference between the reception time of the response and the transmission time data and accumulates it in the storage part 35.

Step S104: The delay time determination part 36 refers to multiple delay times accumulated in the storage part 35 and determines whether or not variations in the delay times exhibit a predetermined increase trend, etc.

Step S105: The communication status acquisition part 34 acquires the signal strength of the communication system from the response to the communication data for each of the communication parts 21 to 23 and accumulates it in the storage part 35.

Step S106: The communication status acquisition part 34 acquires the noise volume of the communication system from the response to the communication data for each of the communication parts 21 to 23 and accumulates it in the storage part 35.

Step S107: The switching determination part 37 compares the communication status based on the increase trend of the delay time, the signal strength, and the noise volume, then determines the switching destination communication part. In the initial status, since the selected communication part is not determined, the switching destination communication part determined in this step is the first selected communication part. Thereafter, when the delay time of the selected communication part exhibits a predetermined increase trend, the switching destination communication part is selected.

Step S108: The communication part selection part 38 selects a communication part to be used for data transmission and reception related to the control of the vehicle and uses it as the selected communication part.

Step S109: The vehicle determination part 31 and the vehicle control part 32 transmit and receive data relating to the control of the vehicle using the selected communication part.

Step S110: The vehicle control part 32 determines whether or not automatic parking is completed. If automatic parking is not completed, the process returns to Step S101. If automatic parking is completed, the process proceeds to Step S111.

Step S111: The communication control apparatus 20 ends the automatic parking process.

Figure 4:
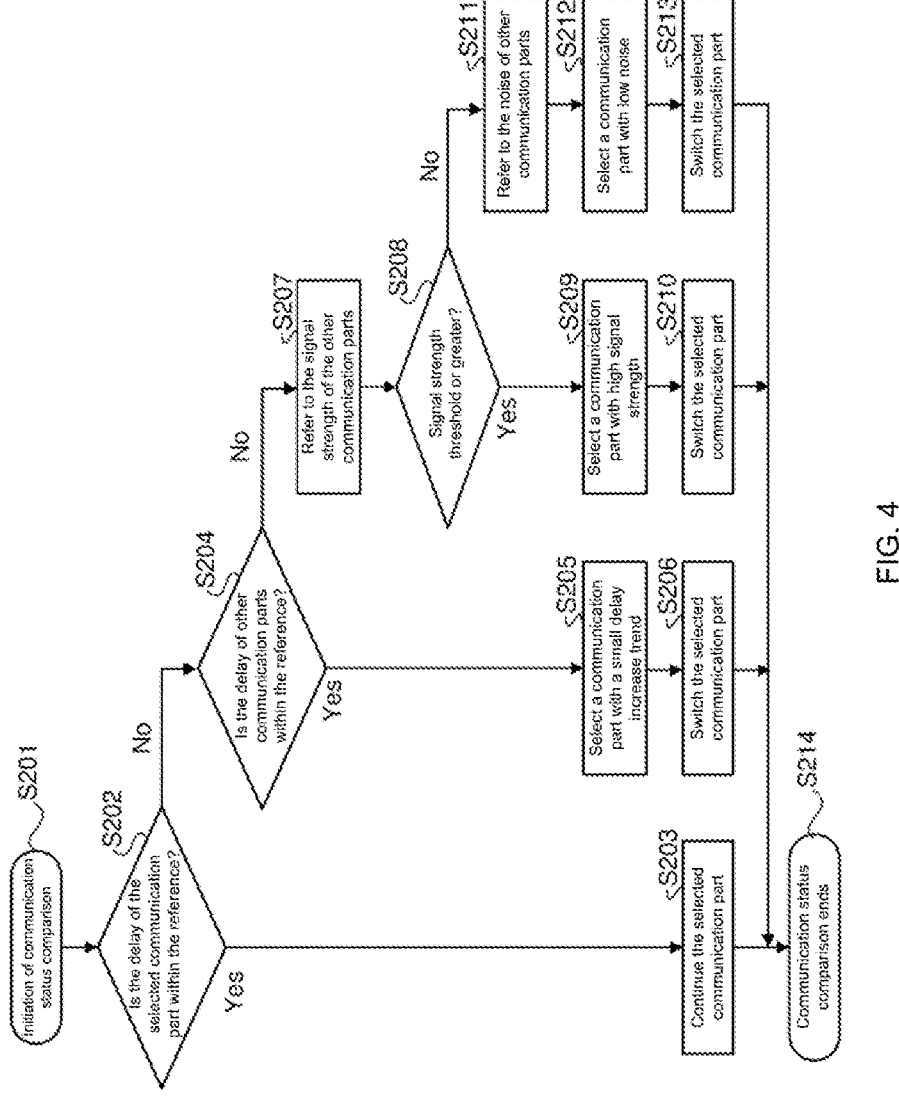
FIG. 4 is a flowchart illustrating the details of communication status comparison.

FIG. 4 is a flowchart illustrating the details of communication status comparison illustrated in FIG. 3. When the communication status comparison is initiated (Step S201), the delay time determination part 36 determines whether or not the delay of the selected communication part is within a predetermined reference (Step S202). Specifically, when each short-term variation, long-term variation, and delay amount is a reference value or less, the delay time determination part 36 determines that the delay is within the reference value. Short-term variations are variations in a short time of the delay time. Long-term variations are variations in a long time of the delay time. The delay amount is the magnitude of the delay time. If any one short-term variation, long-term variation, or delay amount exceeds the reference value, it is determined that the delay is not within the predetermined reference value but exhibits a predetermined increase trend.

When the delay of the selected communication part is within the reference (Step S202; Yes), the communication part selection part 38 continues the current selected communication part (Step S203), and ends the communication status comparison (Step S214).

When the delay of the selected communication part is not within the reference (Step S202; No), the switching determination part 37 determines whether or not the delay of another communication part is within the reference (Step S204). If there is a communication part with a delay that is within the reference value (Step S204; Yes), the switching determination part 37 selects a communication part with a delay that has a small increase trend from among the communication parts with delays that are within the reference value, and sets the selected communication part as a switching destination communication part (Step S205). In addition, the communication part selection part 38 switches the selected communication part by setting the switching destination communication part to a newly selected communication part (Step S206) and ends the communication status comparison (Step S214).

When there is no communication part with a delay that is within the reference (Step S204; No), the switching determination part 37 refers to the signal strength of another communication part stored in the storage part 35 (Step S207) and determines whether or not the signal strength is the threshold value or greater (Step S208). If there is a communication part with a signal strength that is the threshold value or greater (Step S208; Yes), the switching determination part 37 selects a communication part with high signal strength from among the communication parts (whose signal strength is the threshold value or greater), and sets the selected communication part as the switching destination communication part (Step S209). In addition, the communication part selection part 38 switches the selected communication part by setting the switching destination communication part to a newly selected communication part (Step S210) and ends the communication status comparison (Step S214).

When there is no communication part with a signal strength that is the threshold or greater (Step S208; No), the switching determination part 37 refers to the noise of another communication part stored in the storage part 35 (Step S211), selects a communication part with low noise, and sets the selected communication part as the switching destination communication part (Step S212). In addition, the communication part selection part 38 switches the selected communication part by setting the switching destination communication part to a newly selected communication part (Step S213) and ends the communication status comparison (Step S214).

Figure 5:
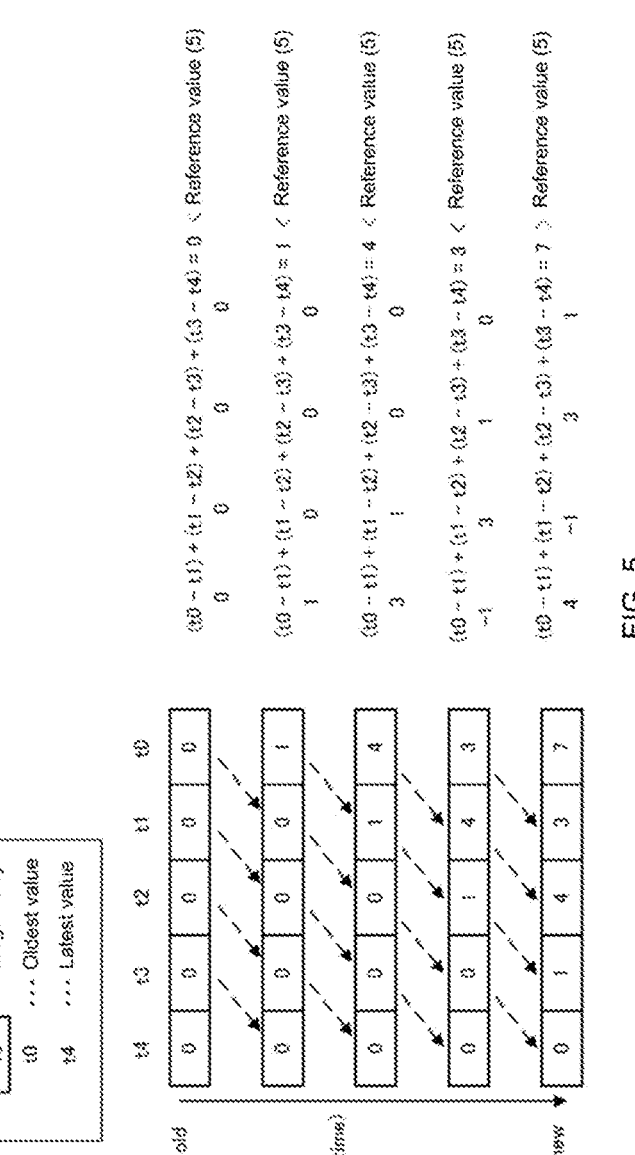
FIG. 5 is an explanatory view of the determination of delay variations.

FIG. 5 is an explanatory view of the determination of delay variations. In FIG. 5, the delay time is evaluated on an 11-point scale from 0 to 10, with an evaluation value of "0" indicating no delay and "10" indicating the maximum delay. Moreover, t0 is the evaluation value of the delay time obtained at the latest timing, while t1 is the evaluation value of the delay time obtained at the one previous timing.

First, in the initial status, the evaluation values of t0 to t4 are all "0." Depending on the first evaluation of the delay time, t0 is "1" while t1 to t4 remain "0." In the second evaluation of the delay time, the previous evaluation value is shifted backward one by one, with t0 being "4." In the third evaluation of the delay time, the previous evaluation value is shifted backward one by one, with t0 being "3." In the fourth evaluation of the delay time, the previous evaluation value is shifted backward one by one, with t0 being "7." Therefore, at the time of the fourth evaluation of the delay time, t1 is "3," t2 is "4," t3 is "1," and t4 is "0."

The delay time determination part 36 totals the increases and decreases of the delay time and determines that the delay time of the selected communication part exhibits a predetermined increase trend when the total value exceeds a reference value.

In FIG. 5, (t0-t1)+(t1-t2)+(t2-t3)+(t3-t4) is obtained as the total value. Because this total value is compared with the reference value "5," when the total value exceeds 5, the delay time determination part 36 determines that the delay time has an increase trend.

FIG. 6 is an explanatory view of the delay amount, short-term variations, and long-term variations. The delay amount corresponds to the evaluation value of the delay in FIG. 5. The short-term variation is the total value of the increases and decreases of the delay time in FIG. 5. In short-term variations, the difference from the delay time acquired at the one previous timing is obtained, whereas, in long-term variations, the difference from the delay time acquired at the fourth previous timing is obtained. As described above, by evaluating the difference between the delay times at different periods enables both a quick response to a steep increase in the delay time and a highly precise response to a slow increase in the delay time.

As described above, the disclosed communication control apparatus 20 comprises: multiple communication parts 21 to 23 corresponding to multiple respective communication parts; a communication part selection part 38 which selects a communication part to be used for transmitting/receiving predetermined data from the multiple communication parts; a communication status acquisition part 34 which acquires the communication status including the delay time for each of the multiple communication parts; a storage part 35 which stores the communication status acquired by the communication status acquisition part; a delay time determination part 36 which refers to the storage part 35, compares the delay times of selected communication parts that are the communication parts (selected by the communication part selection part 38) in a time series manner, and determines variations in the delay time; and a switching determination part 37 which refers to the storage part 35 and determines a communication part to be used for transmission and reception of the predetermined data as a switching destination communication part from the communication status of each communication part 21 to 23 when the delay time of the selected communication part indicates a predetermined increase trend as a result of the determination by the delay time determination part 36, wherein, when the switching determination part 37 determines the switching destination communication part, the communication part selection part

38 selects the switching destination communication part as a newly selected communication part.

With such a configuration and operation, the communication control apparatus 20 enables the switching of communication systems at an appropriate frequency by achieving both early execution of switching and suppression of the frequency of switching.

Moreover, the disclosed communication control apparatus 20 is an in-vehicle apparatus mounted on the vehicle 10. In addition, the predetermined data is data related to the control of the vehicle, wherein the selected communication part transmits data (indicating the status of the vehicle) to a predetermined terminal and receives data (indicating instructions for traveling of the vehicle) from the terminal. This prevents a situation in which the vehicle 10 cannot be controlled in time when the vehicle 10 is remotely controlled.

Moreover, according to the disclosed communication control apparatus 20, the communication status acquisition part 34 acquires the delay time at each predetermined time intervals, wherein the storage part 35 stores the delay time at each predetermined time intervals for at least the selected communication part, and wherein the delay time determination part 36 totals the increases and decreases of the delay time in a predetermined period, determining that the delay time of the selected communication part exhibits a predetermined increase trend when the total value exceeds a reference value. Consequently, the delay times can be simply and effectively compared in a time series manner.

In addition, according to the disclosed communication control apparatus 20, the delay time determination part 36 determines the increase trend using the total of the increases and decreases of the delay time in a first period and the total of the increases and decreases of the delay time in a second period.

This makes it possible to respond to a variety of increase trends and to precisely detect the increase trend of the selected communication parts.

Moreover, according to the disclosed communication control apparatus 20, when there is a communication part which does not correspond to the predetermined increase trend among communication parts other than the selected communication part, the switching determination part 37 sets the communication part as a candidate for the switching destination communication part; while when there is no communication part which does not correspond to the predetermined increase trend, the switching determination part determines the candidate for the switching destination communication part based on the signal strength and/or noise.

As described above, the communication control apparatus 20 communicates the communication data by another communication part in parallel with the predetermined data communication by the selected communication part, thereby allowing it to determine the switching destination by comparing the increase trend of the delay of the communication part, and determine the communication part of the switching destination using another evaluation index when the switching destination cannot be determined by the increase trend of the delay.

Note that the present invention is not limited to the abovementioned examples but includes various modifications. For example, while the abovementioned examples have been described in detail in order to describe the present invention in an easy-to-understand manner, the present invention is not necessarily limited to those with all the described configurations. Moreover, not only the deletion of such configurations, but also the replacement or addition of configurations is possible.

For example, the above example illustrates the case of remote intervention for automatic traveling control. However, the present invention is not limited to automatic traveling control and is widely applicable when a vehicle communicates with the outside during traveling and receives intervention for traveling. As an example, the present invention is also applicable to the transmission of information on the vehicle and its surroundings to the outside for the purpose of driver training and evaluation, in order to provide instructions to the driver and intervene in the control of the vehicle. Specific examples thereof include wireless training for a driver's license, evaluation of the driving skills of an elderly individual, driving support at the request of a driver, etc.

Moreover, automatic traveling is not limited to parking, but can also be applied, for example, to automatic traveling control of passenger cars and buses on public roads, traveling control of vehicles via a vehicle dispatch center, and deliveries, etc. Further, it is not limited to vehicles, but can be applied to control drones, transport robots in factories, catering robots in restaurants, etc.

EXPLANATION OF THE SYMBOLS

10: vehicle, 11: camera, 12: radar, 13: drive control unit, 20: communication control apparatus, 21 to 23: communication part, 31: vehicle determination part, 32: vehicle control part, 33: position acquisition part, 34: communication status acquisition part, 35: storage part, 36: delay time determination part, 37: switching determination part, 38: communication part selection part, 40: terminal, 51: base station, 52: router, 60: server

The invention claimed is:

1. A communication control apparatus mounted on a vehicle which transmits vehicle traveling status signals and receives traveling control signals, comprising:

multiple communication interfaces each corresponding to different communication systems; a communication interface selection part which selects a communication interface to be used for transmitting and receiving data from the multiple communication interfaces as a selected communication interface; a communication status acquisition part which acquires a communication status including a delay time for each of the multiple communication interfaces; a storage unit which stores the communication status acquired by the communication status acquisition part; a delay time determination part, using the communication status stored in the storage unit, compares delay times of selected communication interfaces, that are any of the multiple communication interfaces and the selected communication interface, in a time series manner, and determines variations in the delay times; and a switching determination part determines a communication interface to be used for transmission and reception of the data as a switching destination communication interface from the communication status of each of the selected communication interfaces when the delay time of the selected communication interface indicates a predetermined increase trend as a result of the determination by the delay time determination part, and wherein, when the switching determination part determines the switching destination communication interface, the communication interface selection part selects and sets the switching destination communication interface as the selected communication interface.

2. The communication control apparatus according to claim 1, wherein, the data is data related to control of the vehicle, and the selected communication interface transmits data indicating the communication status of the vehicle to a predetermined terminal and receives data indicating instructions for traveling of the vehicle from the predetermined terminal.

3. The communication control apparatus according to claim 1, wherein the communication status acquisition part acquires the delay time at each predetermined time intervals, the storage unit stores the delay time at each of the predetermined time intervals for the selected communication interface, and the delay time determination part totals increases and decreases of the delay time in a predetermined period, and determines that the delay time of the selected communication interface exhibits the predetermined increase trend when a total value exceeds a reference value.

4. The communication control apparatus according to claim 3, wherein the delay time determination part determines the predetermined increase trend using a total of the increases and decreases of the delay time in a first period and the total of the increases and decreases of the delay time in a second period.

5. The communication control apparatus according to claim 1, wherein there is a communication interface which does not correspond to the predetermined increase trend among the multiple communication interfaces other than the selected communication interfaces, the switching determination part sets the communication interface as a candidate for the switching destination communication interface, and, when there is no communication interface which does not correspond to the predetermined increase trend, the switching determination part determines the candidate for the switching destination communication interface based on at least one of signal strength or noise.

6. A communication control method of a communication control apparatus mounted on a vehicle which transmits vehicle traveling status signals and receives traveling control signals, comprising multiple communication interfaces each corresponding to different communication systems, the method comprising: a communication interface selection step which selects a communication-interface to be used for transmitting and receiving data from the multiple communication interfaces, as a selected communication interface; a communication status acquisition step which acquires a communication status including a delay time for each of the multiple communication interfaces; a storage step which stores the communication in a storage unit; a delay time determination step which uses the communication status for each of the multiple communication interfaces stored in the storage unit, compares delay times of selected communication interfaces, that are any of the multiple communication interfaces and the selected communication interface in a time series manner, and determines variations in the delay times; a switching determination step which determines a communication interface to be used for transmission and reception of the data as a switching destination communication interface from the communication status of each of the selected communication interfaces when the delay time of the selected communication interface indicates a predetermined increase trend as a result of the determination by the delay time determination step; and a switching step of selecting and setting the switching destination communication interface as the selected communication interface when the switching determination step determines the switching destination communication interface.

* * * * *